(12) United States Patent
Slavic

(10) Patent No.: US 10,107,330 B2
(45) Date of Patent: Oct. 23, 2018

(54) BEARING DEVICE FOR A SHAFT, IN PARTICULAR OF A TURBOCHARGER DEVICE

(71) Applicant: CONTINENTAL AUTOMOTIVE GMBH, Hannover (DE)

(72) Inventor: Sasa Slavic, Heidelberg (DE)

(73) Assignee: Continental Automotive GmbH, Hannover (DE)

( * ) Notice: Subject to any disclaimer, the term of this patent is extended or adjusted under 35 U.S.C. 154(b) by 32 days.

(21) Appl. No.: 15/321,824

(22) PCT Filed: May 28, 2015

(86) PCT No.: PCT/EP2015/061863
§ 371 (c)(1),
(2) Date: Dec. 23, 2016

(87) PCT Pub. No.: WO2015/197304
PCT Pub. Date: Dec. 30, 2015

(65) Prior Publication Data
US 2017/0159703 A1 Jun. 8, 2017

(30) Foreign Application Priority Data
Jun. 25, 2014 (DE) .......... 10 2014 212 155

(51) Int. Cl.
*F16C 19/18* (2006.01)
*F16C 25/08* (2006.01)
*F16C 43/04* (2006.01)

(52) U.S. Cl.
CPC .......... *F16C 19/185* (2013.01); *F16C 25/083* (2013.01); *F16C 43/04* (2013.01); *F16C 2360/24* (2013.01)

(58) Field of Classification Search
CPC .................. F16C 19/1847; F16C 19/185; F16C 2229/00; F16C 25/08; F16C 25/083;
(Continued)

(56) References Cited

U.S. PATENT DOCUMENTS 3,578,829 A 5/1971 Hata et al.
4,325,590 A 4/1982 Pethis
(Continued)

FOREIGN PATENT DOCUMENTS

CN 101014753 A 8/2007
CN 101644185 A 2/2010
(Continued)

OTHER PUBLICATIONS

Machine Translation of JP 2009-162277 (Year: 2009).*

*Primary Examiner* — Alan B Waits
(74) *Attorney, Agent, or Firm* — Laurence A. Greenberg; Werner H. Stemer; Ralph E. Locher

(57) ABSTRACT

A bearing device for a shaft has at least two axially spaced-apart, radial anti-friction bearings with rolling bodies. In each of the anti-friction bearings, an inner race is formed for the rolling bodies on an inner bearing element which is connected fixedly to the shaft. An outer race is formed for the rolling bodies on an outer bearing sleeve having at least two bearing sleeve elements which are guided coaxially with respect to one another in a guide device. Each of the anti-friction bearings is assigned a separate bearing sleeve element with in each case one anti-friction bearing running surface. The guide device converts a rotation of at least one of the bearing sleeve elements about the shaft longitudinal axis into a spacing change of the two bearing sleeve elements. The axial spacing between the bearing sleeve elements can be adjusted and/or fixed and/or prestressed with spring element.

10 Claims, 4 Drawing Sheets

(58) Field of Classification Search
CPC ...... F16C 43/04; F16C 2360/24; F01D 25/16; F05B 2220/40
See application file for complete search history.

(56) References Cited

U.S. PATENT DOCUMENTS

| | | | |
|---|---|---|---|
| 4,993,851 A * | 2/1991 | Nakanishi | F16C 19/16 384/512 |
| 5,634,727 A | 6/1997 | Lin et al. | |
| 6,983,672 B2 | 1/2006 | Smith | |
| 8,454,242 B2 | 6/2013 | Mavrosakis | |
| 2007/0134106 A1* | 6/2007 | McKeirnan, Jr. | F01D 25/16 417/407 |
| 2007/0183704 A1 | 8/2007 | Umekawa | |
| 2010/0172739 A1 | 7/2010 | Arnold | |
| 2013/0223997 A1* | 8/2013 | Childe | F16C 27/066 415/170.1 |
| 2013/0272854 A1 | 10/2013 | Schmidt et al. | |
| 2014/0086731 A1* | 3/2014 | Schmidt | F01D 25/125 415/170.1 |
| 2015/0176651 A1* | 6/2015 | Back | F16C 33/7806 384/484 |

FOREIGN PATENT DOCUMENTS

| | | |
|---|---|---|
| CN | 103457098 A | 12/2013 |
| DE | 3306260 A1 | 8/1984 |
| DE | 3418499 C1 | 8/1985 |
| DE | 102010054926 A1 | 6/2012 |
| DE | 102010054939 A1 | 6/2012 |
| GB | 2135399 A | 8/1984 |
| GB | 2158890 A | 11/1985 |
| JP | 2006177550 A | 7/2006 |
| JP | 2006266395 A | 10/2006 |
| JP | 2009162277 A | 7/2009 |
| WO | 2012079881 A1 | 6/2012 |

* cited by examiner

BEARING DEVICE FOR A SHAFT, IN PARTICULAR OF A TURBOCHARGER DEVICE

BACKGROUND OF THE INVENTION

Field of the Invention

The invention falls within the area of mechanical engineering and can be used to particular advantage in the automotive industry. However, this does not exhaust the uses of the invention; on the contrary, bearing devices according to the invention with rolling bearings can be used to advantage especially wherever the aim is to support a shaft by means of two combined rolling bearings which, together, allow not only very rapid rotations but are also supposed to stabilize the shaft or some other rotating body against tilting movements. The invention demonstrates some of its advantages particularly at high speeds of rotation, of the kind which are common in turbocharger devices for internal combustion engines. Apart from the automotive industry, it is therefore also possible to conceive of use in other areas in which internal combustion engines with turbocharger devices are used, e.g. with marine engines and aircraft engines.

One known practice in turbocharger devices is to use one or more rolling bearings to rotatably support a shaft which carries an exhaust-driven turbine at one end and is coupled at its other end to a compressor impeller that pre-compresses the intake air of an internal combustion engine. Shafts of this kind in turbochargers run at variable but, in all cases, high speeds and must have long service lives under high loads and at high temperatures. Optimized support is an essential prerequisite for this.

In an arrangement of this kind with two rolling bearings, the respective inner bearing elements (radially inner bearing rings) are generally each connected to the shaft and possibly integrated into the latter. According to the prior art, it is then possible to provide an outer sleeve, which can be mounted on the shaft with the rolling elements in between. For the adjustment of the two bearings, it is important here that the axial spacing between the inner bearing elements is matched to the axial spacing between the two bearing sleeve elements. Problems arise, for example, in the case of temperature changes, where there is an increase in the length of the shaft and/or of the outer sleeve that can result in misalignment of the bearings. Mounting of a bearing assembly of this kind can also be laborious.

In this context, WO 2012/079881 A1 discloses a shaft bearing arrangement for a turbocharger with two separate outer bearing sleeves coupled by means of a spring arrangement.

BRIEF SUMMARY OF THE INVENTION

Given the background of the prior art, it is the underlying object of the present invention to provide a bearing device of the type described which allows optimization of the geometry of the rolling bearings combined with a simple assembly process.

The object is achieved by means of the features of the invention as claimed in respect of a bearing device and by means of the features as claimed in respect of a method for producing a bearing device. The dependent claims contain advantageous embodiments of the invention.

Accordingly, the invention is directed specifically to a bearing device for a shaft, in particular of a turbocharger device of an internal combustion engine, having at least two radial rolling bearings, which are spaced apart axially and have rolling elements, wherein, in each of the rolling bearings, an inner running surface is formed for the rolling elements on an inner bearing element, which is connected in a fixed manner to the shaft, in particular connected integrally thereto, and an outer running surface is formed on an outer bearing sleeve having at least two bearing sleeve elements, which are guided coaxially with respect to one another in a guide device, and wherein each of the rolling bearings is assigned a separate bearing sleeve element having in each case one rolling bearing running surface, the guide device converts a rotation of at least one of the bearing sleeve elements about the shaft longitudinal axis into a change in the spacing between the two bearing sleeve elements, and the two bearing sleeve elements can be adjusted and/or fixed and/or preloaded by means of a spring element in the axial direction in respect of their mutual spacing.

Each of the two rolling bearings has an inner bearing element (corresponding to an inner bearing ring) and an outer bearing element in the form of a bearing sleeve element (corresponding to a radially outer bearing ring). The inner bearing elements can be connected to the shaft, being shrunk on to the latter for example, but they can also be integrated into the shaft, i.e. the corresponding running surfaces (raceways) of the inner bearing elements can be provided directly on the shaft surface. For this purpose, it is then expedient if the shaft has offsets.

To enable the axial spacing between the two bearing sleeve elements to be matched to the spacing between the two inner bearing elements, the two bearing sleeve elements are each provided separately and are adjusted relative to one another in respect of their axial spacing during assembly or during the mounting of the bearing device on the shaft. For this purpose, the bearing sleeve elements can be moved in the axial direction relative to one another for adjustment. They can be preloaded relative to one another in the axial direction by means of a spring element. For this purpose, the spring force does not have to be aligned directly in the axial direction.

By virtue of the embodiment according to the invention, it is possible to preload the bearing sleeve elements relative to the two inner bearing elements in such a way in the axial direction, with the rolling elements in between, that play-free running of the rolling elements on the running surfaces (raceways) of the rolling bearings is ensured. The preloading can be chosen in such a way, for example, that, in the case of temperature changes in the shaft, which are to be expected, the corresponding increases or decreases in length can be compensated elastically and do not lead to the occurrence of greater play in the rolling bearings.

By virtue of the coaxial guidance of the bearing sleeve elements, tilting of these elements relative to one another is virtually impossible and they can be moved relative to one another only in the axial direction, although simultaneous rotation is not excluded. By virtue of the support in the two rolling bearings, there is adequate tilting stability for the supported shaft. The ability for axial movement of the two bearing sleeve elements allows them to be mounted jointly in shortened form as a preassembled bearing sleeve and then adjusted to an appropriate spacing by bracing the bearings, with the rolling elements, relative to one another in such a way that the rolling elements roll without play on the rolling surfaces/raceways of the bearings. Moreover, the two bearing sleeve elements can be preloaded in the axial direction by means of a spring element in such a way that play-free bearing assembly or bearing assembly with a defined play is ensured.

In the context of a guide device, axially movable and mutually coaxial guidance of the two bearing sleeve elements can be achieved if the two bearing sleeve elements are each connected by sleeves that slide telescopically one inside the other or if the two bearing sleeve elements can slide in the axial direction in or on a third element, e.g. in the form of a guide sleeve.

A spring element provided between the bearing sleeve elements can pull them together in the axial direction or push them apart axially, for example, depending on the preferred area of the running surface on which the rolling elements of the rolling bearings are supposed to run.

Another advantageous embodiment of the invention envisages that suitable shaping, in particular in the manner of a thread, a slotted guide or a bayonet joint, is used to enable the two bearing sleeve elements to be moved relative to one another, or in each case relative to a third shaped element, in a combined coaxial rotary movement and an axial translational movement, in particular in a screwing movement, at least in a partial range of their movement.

For example, the two bearing sleeve elements can be guided in such a way on one another or on a third shaped element, in the manner of a thread or by means of a slotted guide or by means of a circumferentially beveled shape on the end of at least one of the bearing sleeve elements, that they can be screwed relative to one another while carrying out a partially axial movement. In this case, a spring element provided between the bearing sleeve elements can, for example, develop a force between them only in the circumferential direction of the bearing sleeve elements and can thus simultaneously brace the two bearing sleeve elements in the axial direction relative to one another. To set the desired spacing in the axial direction, the two bearing sleeve elements can then be rotated or screwed relative to one another.

Thus, it is thereby advantageously possible to embody the invention by preloading the two bearing sleeve elements relative to one another in the axial direction by means of a spring element.

Another advantageous embodiment of the invention envisages that the spring element is arranged axially substantially between the two bearing sleeve elements. With such an arrangement of the spring element, a space-saving design of the bearing device is achieved.

It is furthermore advantageously possible to provide for the spring element to be designed as at least one wire spring. The wire spring can run around in the form of a partial ring at least partially in the circumferential direction of the bearing sleeve elements and can brace said elements resiliently relative to one another in the circumferential direction. Especially if the two bearing sleeve elements are coupled to one another by a screwing movement, there is an expansion of the spring when the two bearing sleeve elements are screwed apart, i.e. when there is a screwing/rotary movement which spaces the two bearing sleeve elements axially apart, but the two bearing sleeve elements can also be connected to one another by means of wire spring in such a way that said spring is expanded or elastically deformed by bending when the bearing sleeve elements are screwed together.

Another advantageous embodiment of the invention envisages that the spring element is designed as at least one wire spring in the form of a circular ring segment, which has at its ends fixing elements, in particular in the form of ends bent radially inward, which engage on the outer contour of one of the two bearing sleeve elements in each case and exert a force directed in the circumferential direction in the case of expansion. This embodiment of the invention allows particularly simple assembly of the bearing device with a spring element.

In this context, provision can advantageously be made for the spring element to be resiliently compressible and/or expandable substantially in the circumferential direction of the two bearing sleeve elements.

According to the invention, another way of achieving the object can consist in that the two bearing sleeve elements are secured at a fixed distance from one another in the axial direction. In this case, the distance between the two bearing sleeve elements can be set in a suitable way for adjustment, such that the two rolling bearings are set without play, taking into account thermal expansions that will subsequently occur.

After producing this state, the two bearing sleeve elements can be secured at a fixed distance from one another in the axial direction. For this purpose, conventional joining techniques, such as welding, brazing or adhesive bonding, can be used. It is thereby possible to compensate in an optimum way for production and assembly tolerances during the assembly of the bearing device, such that the rolling bearings run without play and are also not misaligned in the presence of certain thermal deformations. The bearing sleeve elements can also be latched to one another or to a common guide element with the aid of mechanical latching means. In particular, latching in the manner of a bayonet joint is conceivable within the scope of the invention.

The invention relates not only to a bearing device in accordance with the above statements but also to a method for producing a bearing device, in which, first of all, rolling elements of a first radial rolling bearing are mounted on the inner bearing element on the shaft, the outer bearing sleeve with both bearing sleeve elements is thereupon mounted in such a way that one bearing sleeve element is in engagement with the rolling elements, the rolling elements of the second radial rolling bearing are thereupon mounted in an axially shortened state of the outer bearing sleeve, i.e. a shortened distance between the two bearing sleeve elements, and the first and the second bearing sleeve element are thereupon adjusted relative to one another in the axial direction and are then fixed relative to one another.

The invention can also envisage that, first of all, rolling elements of a first radial rolling bearing are mounted on the inner bearing element on the shaft, that the outer bearing sleeve is thereupon mounted in such a way that one bearing sleeve element is in engagement with the rolling elements, that the rolling elements of the second radial rolling bearing are thereupon mounted in an axially shortened state of the outer bearing sleeve, which corresponds to a shortened distance between the bearing sleeve elements, and that the first and the second bearing sleeve element are thereupon pulled apart axially, in particular by rotation, and braced relative to one another by means of a spring element, in particular being connected to one another by means of a spring element.

BRIEF DESCRIPTION OF THE SEVERAL VIEWS OF THE DRAWING

The invention is shown and then described below with reference to an illustrative embodiment in figures of a drawing, in which.

DESCRIPTION OF THE INVENTION

Figure 1:
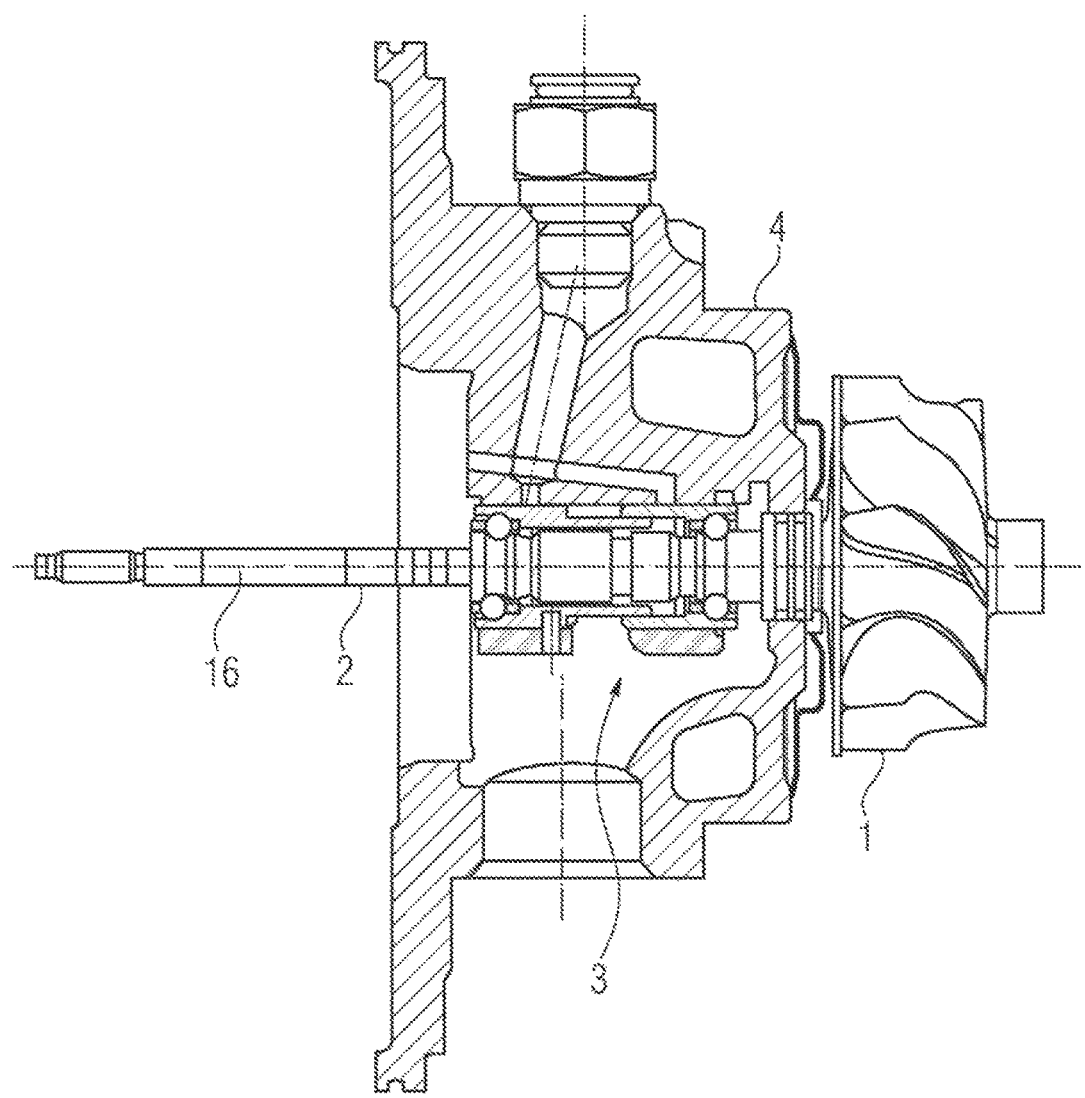
FIG. 1 shows part of the turbocharger device having a shaft and a bearing device in a longitudinal section.

FIG. 1 shows parts of a turbocharger device of an internal combustion engine in a longitudinal section, wherein the right-hand side shows a turbine wheel 1, which is secured on a rotatably mounted shaft 2. The turbine wheel 1 is located in an exhaust gas flow of an internal combustion engine and is driven by said flow.

The shaft 2 is supported radially in a bearing assembly 3 and, in this arrangement, passes through a housing 4, in which lubricating devices for the bearing device 3 are provided, for example. A compressor impeller (not shown in the drawing), which compresses the intake air in the intake flow of the internal combustion engine, is provided on the opposite side of the housing 4 from the turbine wheel 1.

During operation of the turbocharger device, the bearing device 3 is exposed to large temperature fluctuations, wherein, in particular, large temperature differences can occur between the exhaust gas side and the compressor side.

Figure 2:
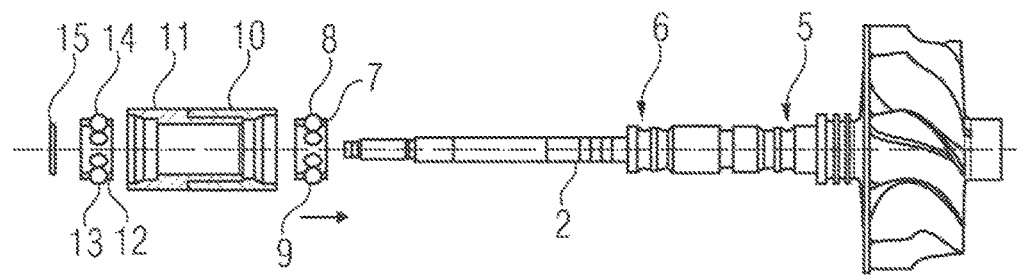
FIG. 2 shows a shaft with two inner bearing elements and two unmounted sets of rolling elements and corresponding bearing sleeve elements in a longitudinal section.

FIG. 2 shows the shaft 2 with various offsets, wherein inner bearing elements 5, 6 in the form of axial segments of the shaft 2 are provided at two points, wherein a running surface/raceway for the rolling elements of a rolling bearing is provided in each of the inner bearing elements 5, 6. In cross section, therefore, a groove-type recess can be seen, which in each case runs around in the circumferential direction of the shaft 2.

The left-hand side of FIG. 2 shows a cage 7 with rolling elements 8, 9 in the form of balls as well as two bearing sleeve elements 10, 11 and a further bearing cage as well as further rolling elements 13, 14. A spring element 15 is furthermore shown in the unmounted state.

Figure 3:
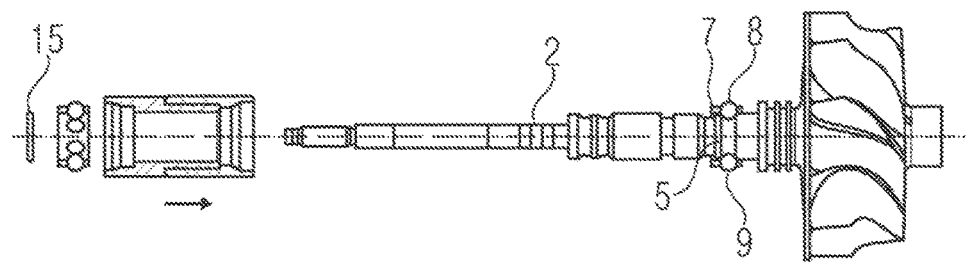
FIG. 3 shows an assembly similar to that shown in FIG. 2, wherein a first set of rolling elements is arranged on an inner bearing element on the shaft.

To assemble the bearing device, as can be seen from a comparison of FIG. 2 and FIG. 3, the bearing cage 7 with the corresponding rolling elements 8, 9 is first of all mounted on the inner bearing element 5 of the shaft 2. In the simplest case, the bearing ring 7 is simply pushed on. The rolling elements 8, 9 can be designed as balls but can also be in any other known form of rolling elements.

Figure 4:
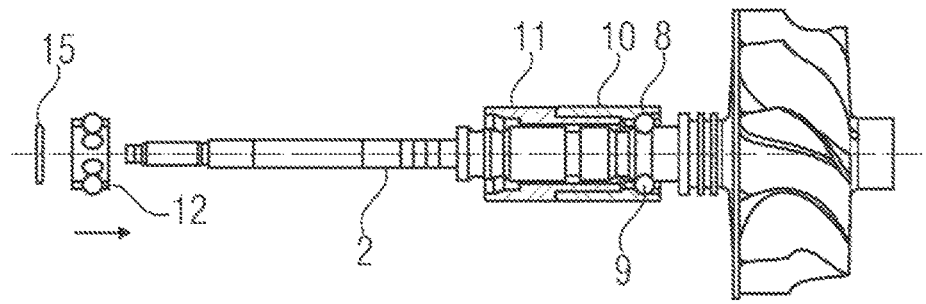
FIG. 4 shows an assembly like that in FIGS. 2 and 3, wherein, in addition, bearing sleeve elements at a shorter axial distance from one another than in the final state have been mounted.

FIG. 4 shows that, after the bearing cage 7, the two bearing sleeve elements 10, 11 as a combined interconnected component are pushed onto the shaft 2 until the first bearing sleeve element 10 is situated above the first inner bearing element 5 in such a way that the rolling elements 8, 9 can run on the running surfaces/raceways of the bearing, which are formed by the inner bearing ring and the first bearing sleeve element.

Figure 5:
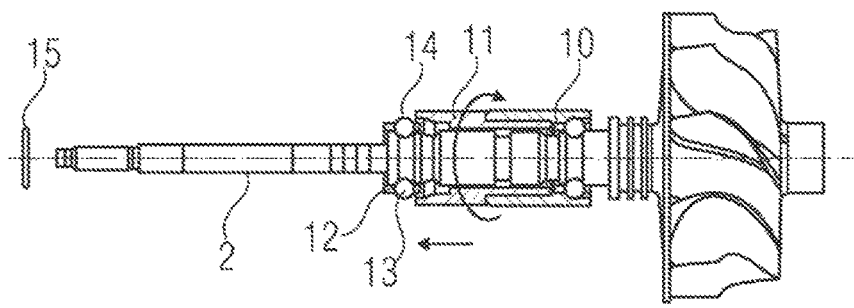
FIG. 5 shows an assembly like that in FIG. 4, wherein, in addition, a second set of rolling elements has been mounted.

In FIG. 5, it can be seen that, after the two bearing sleeve elements 10, 11, the second bearing cage 12 with the corresponding rolling elements 13, 14 is mounted on the shaft 2, such that the rolling elements 13, 14 come to rest on the inner running surface/raceway of the second inner bearing element 6. For this purpose, the second bearing sleeve element 11 is moved closer to the first bearing sleeve element 10 than would correspond to its end position.

The two bearing sleeve elements 10, 11 can be moved axially relative to one another, one inside the other or on a common guide sleeve, in the manner of a telescope and, in the illustration in FIG. 5, mounted together and pushed together axially, thus allowing the second bearing cage 12 with the bearing elements 13, 14 to be moved easily to its position in the region of the second inner bearing element 6.

Figure 6:
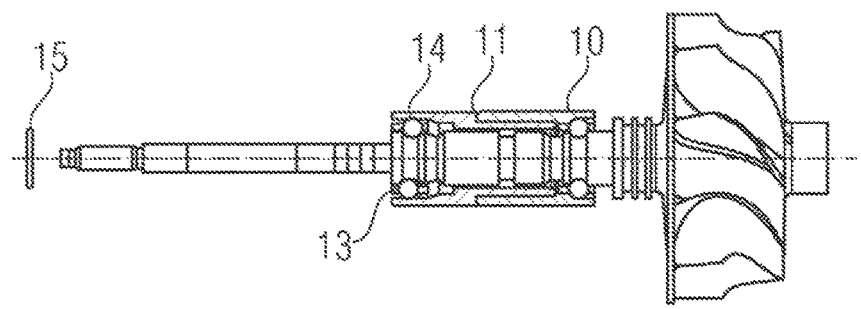
FIG. 6 shows an assembly like that in FIG. 5, wherein two separate elements of the bearing device, each having one bearing sleeve element, have been moved axially relative to one another in such a way that the two rolling bearings are adjusted axially relative to one another.

In the next step, as can be seen in FIG. 6, the two bearing sleeve elements 10, 11 are pushed apart axially until the second bearing sleeve element 11 comes to rest with its running surface/raceway above rolling elements 13, 14. Moreover, it is possible to apply to the second bearing element 11 an axial preload such that the rolling elements of both rolling bearings rest without play or with a defined play on the corresponding running surfaces. The two bearing sleeve elements 10, 11 can thereupon be connected to one another, for example, e.g. by means of known joining techniques, such as brazing, welding, adhesive bonding, clamping, latching by means of latching elements or screwing.

As a preferred option, it is also possible, for example, to configure the two bearing sleeve elements 10, 11 in such a way, by means of a screwed joint or thread-type complementary shaping in the region of their axial overlap, that they can be moved axially relative to one another by screwing relative to one another.

For example, the bearing sleeve elements can have mutually facing oblique end faces which slide on one another in a screw-like manner during a rotary movement. If the screw profile is self locking, it is possible for the spacing in the axial direction to be set by means of this profile.

Figure 7:
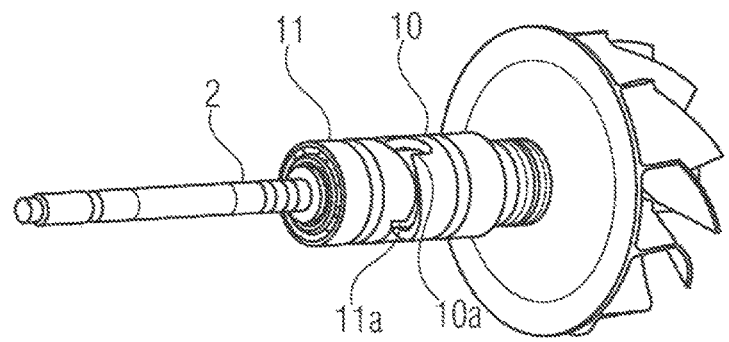
FIG. 7 shows a three-dimensional view of a shaft having a bearing device according to the invention without a spring element.

In principle, there is the advantageous possibility, with or without a guide sleeve of this kind, of bracing the two bearing sleeve elements 10, 11 relative to one another in the axial direction by means of a spring element 15. In the illustrative embodiment shown, the bearing sleeve elements 10, 11 are, as can be seen in FIG. 7, capable of being screwed relative to one another and are each provided with shoulders 10a, 11a, which can be braced with respect to one another, by means of a spring element 15 extending and flexing in the circumferential direction, by a spring force is acting in the circumferential direction and/or in the axial direction. The ends of the bearing sleeve elements are helically beveled and matched to one another in complementary fashion, thus ensuring that the ends slide on one another during a screwing movement and that a relative rotary movement of the bearing sleeve elements is converted into an axial movement.

Figure 8:
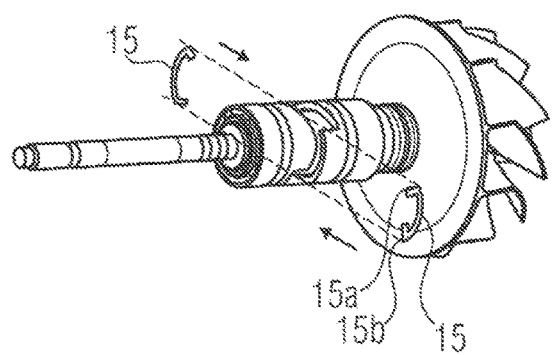
FIG. 8 shows an assembly like that in FIG. 7, wherein, in addition, the spring elements are shown.

FIG. 8 shows a spring 15 in the unmounted state, wherein the spring is in the form of a circular ring segment with two bent ends 15a, 15b projecting radially inward and radially with respect to the shaft. The radially inward-bent ends 15a, 15b project over the shoulders 10a, 11a of the bearing sleeve elements 10, 11 and brace the latter relative to one another in the circumferential direction of the shaft 2.

Figure 9:
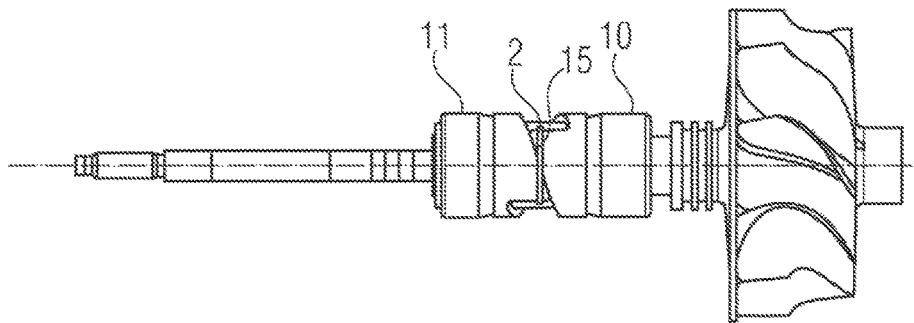
FIG. 9 shows a side view of a shaft having a bearing device, wherein a mounted spring element can also be seen.

FIG. 9 shows the two bearing sleeve elements 10, 11 in a side view, wherein the spring element 15 can be seen between them, said spring allowing a further rotation of the two bearing sleeve elements only by overcoming the spring force, the coupling of the screwing movement with an axial relative movement between the bearing sleeve elements thus also ensuring an axial preload. This provides a stable bearing assembly, which allows a permanent setting of two rolling bearings relative to one another in the axial direction, e.g. for use in turbocharger devices, in such a way that the rolling elements rest without play on the running surfaces and low-wear and low-friction running of the shaft is hence achieved, even at high speeds of rotation and at varying temperatures.

The invention claimed is:

1. A bearing device for a shaft, comprising:
   at least two rolling bearings spaced apart in an axial direction and having rolling elements;
   an inner bearing element fixedly connected to, or integrally formed with, the shaft;
   an outer bearing sleeve formed with at least two bearing sleeve elements;
   each of said rolling bearings having an inner running surface for said rolling elements formed on said inner bearing element and having an outer running surface formed on said outer bearing sleeve;
   each of said rolling bearings being assigned a separate bearing sleeve element each formed with one outer running surface for said rolling elements;
   said at least two bearing sleeve elements being disposed coaxially with respect to one another and said two bearing sleeve elements having mutually facing oblique end faces disposed to slide on one another upon being rotated relative to one another for converting a rotation of at least one of said bearing sleeve elements about a longitudinal axis of the shaft into a change in a spacing between said two bearing sleeve elements; and
   wherein said two bearing sleeve elements are preloaded by a spring element and said spring element is resiliently compressible and/or expandable substantially in a circumferential direction of said two bearing sleeve elements and said spring element braces said two bearing sleeve elements relative to one another in the circumferential direction.

2. The bearing device according to claim 1, wherein said two bearing sleeve elements are shaped to enable said two bearing sleeve elements to be moved relative to one another relative to a third shaped element, in a combined coaxial rotary movement and an axial translational movement, at least in a partial range of a movement thereof.

3. The bearing device according to claim 2, wherein the suitable shaping is a bayonet joint.

4. The bearing device according to claim 1, wherein said spring element is at least one wire spring.

5. The bearing device according to claim 1, wherein said spring element is at least one wire spring having a first end connected to a first of said bearing sleeve elements and a second end connected to a second of said bearing sleeve elements.

6. The bearing device according to claim 1, wherein said spring element is at least one wire spring formed as a circular ring segment, said ring segment having ends with fixing elements formed to engage on an outer contour of one of said two bearing sleeve elements in each case.

7. The bearing device according to claim 6, wherein said fixing elements are the ends of said ring segment bent radially inward.

8. The bearing device according to claim 1, configured as a bearing for a shaft of a turbocharger device of an internal combustion engine.

9. A method for producing a bearing device according to claim 1, the method comprising:
   mounting rolling elements of a first radial rolling bearing on an inner bearing element on the shaft;
   subsequently mounting an outer bearing sleeve to cause one bearing sleeve element to be in engagement with the rolling elements;
   subsequently mounting the rolling elements of the second radial rolling bearing in an axially shortened state of the outer bearing sleeve; and
   subsequently pulling the first and second bearing sleeve elements apart axially by rotating the sleeve elements relative to one another about a longitudinal axis of the shaft, and subsequently bracing the first and second bearing sleeve elements relative to one another in a circumferential direction by using a spring element which is resiliently compressible and/or expandable substantially in a circumferential direction of said two bearing sleeve elements.

10. The method according to claim 9, which comprises connecting the first and second bearing sleeve elements to one another with the spring element.

* * * * *